United States Patent [19]

Murray, Sr.

[11] Patent Number: 5,108,472
[45] Date of Patent: Apr. 28, 1992

[54] GAS-LIQUID SEPARATOR

[75] Inventor: Curtis W. Murray, Sr., Big Prairie, Ohio

[73] Assignee: Pride of the Hills Mfg., Inc., Big Prairie, Ohio

[21] Appl. No.: 609,465

[22] Filed: Nov. 5, 1990

[51] Int. Cl.⁵ .............................................. B01D 19/00
[52] U.S. Cl. ...................................... 55/219; 55/337; 55/310
[58] Field of Search ................. 55/185, 169, 219, 170, 55/337, 310, 311

[56] References Cited

U.S. PATENT DOCUMENTS

| | | | |
|---|---|---|---|
| 1,533,744 | 4/1925 | Lorraine | 55/169 |
| 1,863,759 | 6/1932 | McGraw et al. | 55/169 |
| 2,547,769 | 4/1951 | Packie et al. | 55/337 |
| 3,192,691 | 7/1965 | Ely | 55/337 |
| 4,863,606 | 9/1989 | Ryall | 261/DIG. 72 |
| 4,883,508 | 11/1989 | Lansing | 55/486 |

OTHER PUBLICATIONS

Nor-pak High Performance Plastic Tower Packing-NSW Corp., P.O. Box 2222, Roanoke, Va.

Primary Examiner—Bernard Nozick
Attorney, Agent, or Firm—Michael Sand Co.

[57] ABSTRACT

This invention relates to an improved gas-liquid separator for separating natural gas from naturally-occurring liquid constituents emitting from natural gas wells. The separator comprises a hollow pressure vessel having a tangential inlet line for the combined mixture located in a medial region of the vessel, and upper gas outlet and lower liquid outlet lines. A packing column located in an upper region comprised of a plurality of hollow cage-like non-interlocking plastic elements such as polypropylene contained between an apertured baffle plate and a mist-separator plate to obtain superior wetting of the liquid components of the mixture for their separation from the gas. The separator is capable of maintenance-free automatic operation over substantial periods of time measured in years.

16 Claims, 2 Drawing Sheets

5,108,472

GAS-LIQUID SEPARATOR

BACKGROUND OF THE INVENTION

1. Technical Field

This invention relates to a gas-liquid separator and, in particular, to an improved gas-liquid separator for use at the site of natural gas wells for separating natural gas from liquid materials such as water, brine, crude oil, distillates and the like which are normally contained in minor amounts along with gas emitting from natural gas wells. More particularly, the invention relates to an improved gas-liquid separator having lesser overall dimensions and lighter weight which can be readily mounted adjacent one or more natural gas wells for cleaning such gas prior to its transmission to natural gas distribution systems. The separator includes a minimum number of working components and can be operated with minimal maintenance over substantial periods of time such as from 5 to 20 years without pluggage or loss of efficiency.

2. Background Information

Conventional types of gas-liquid separators which have been used previously have been based upon gravity separation of minor amounts of liquid contaminants from the natural gas. Such liquids cannot be permitted to flow into natural gas distributions systems wherein they can cause pluggage and reduced gas flow. Such prior separators have been rather massive in dimensions having substantial weight requirements to withstand the pressures of the emitting gas. Such equipment has commonly required cranes or front-end loaders for their positioning in place adjacent to natural gas wells as well as being less efficient and more costly to manufacture. In such gravity-type separators the theory of operation has basically involved the creation of small droplets of liquids on broad surfaces of packing materials with the effect of gravity being relied upon for separation of the liquid droplets from the gaseous products of the well, normally, methane for heating or petrochemical use. Such separators have previously encountered problems of pluggage where ceramic-type packing materials have been employed which permit deposition of minerals from water and brine on the packing, for example, when removed from the natural gas over substantial periods of time. The previous occurrence of such pluggage has increased the cost of well maintenance and reduced the production of such wells requiring more frequent shutdowns for maintenance and replacement of separator components such as the common packing materials.

SUMMARY OF THE INVENTION

Objectives of the present invention include providing an improved gas-liquid separator for cleaning natural gas of its liquid constituents which normally occur in minor amounts depending upon the characteristics of the natural gas well and the source of gas production.

Another object of this invention is to provide a low-cost economical gas-liquid separator which can be readily installed by one or more well-maintenance personnel due to its lightweight character and minimal size for long-term automatic separation of the gaseous and liquidus fluids emitting from the well. Such separator is usually mounted closely adjacent the well site for long-term maintenance-free production of the gas well without interruption or reduction in flow.

Another objective of the invention is to provide an improved gas-liquid separator having a most efficient packing column for improved wetting of the packing material by the liquid components for ready concentration of such liquids for their removal from the separator automatically over substantial periods of time, the gas component being efficiently cleaned to be essentially liquid free.

A still further objective of the invention is to provide a gas-liquid separator which is capable of operation at gas pressures normally ranging from about 200 to 550 psi and volumetric rates ranging from about 0 to 1,000,000 cubic feet per day. The entire production is efficiently scrubbed and separated with a most efficient plastic packing material wherein the gas-liquid mixture is conveyed therethrough with a minimal pressure drop ranging from about 2 to 4 inches of water column. The packing material is preferably comprised of a plurality of non-interlocking cage-like plastic elements which are either spherical or cylindrical in shape to provide extremely great surface areas which can be wetted by the liquids during circuitous passage of the gas-liquid mixture therethrough.

The foregoing objectives and advantages are obtained by the improved gas-liquid separator which comprises a hollow cylindrical pressure vessel having a tangential inlet for the combined mixture located in an intermediate area of the vessel with the packing material located between an apertured baffle plate and a mist-separation plate located in an upper region of the vessel. Collection means for the liquids is provided at a lower region of the vessel for automatic liquid level control and periodic discharge of the liquid constituents over substantial periods of time requiring little or no maintenance without pluggage or loss of efficiency. The packing material is preferably comprised of cage-like spherical or cylindrical shaped non-interlocking plastic packing elements to provide a circuitous path therethrough with the combined gas-liquid mixture capable of wetting the large surface areas of the plastic elements to facilitate the transmission of essentially non-liquid-containing clean gas from an upper region of the separator to a distribution system on a continuous basis with the volumetric rate of production varying from 0 to 1,000,000 cubic feet per day, the vessel being operable at pressures preferably ranging from about 200 to 550 psi and at a temperature ranging from about ambient temperature to about 180° F. throughout its operative life.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Similar numerals refer to similar parts and elements throughout the drawings.

DESCRIPTION OF THE PREFERRED EMBODIMENT

Figure 1:
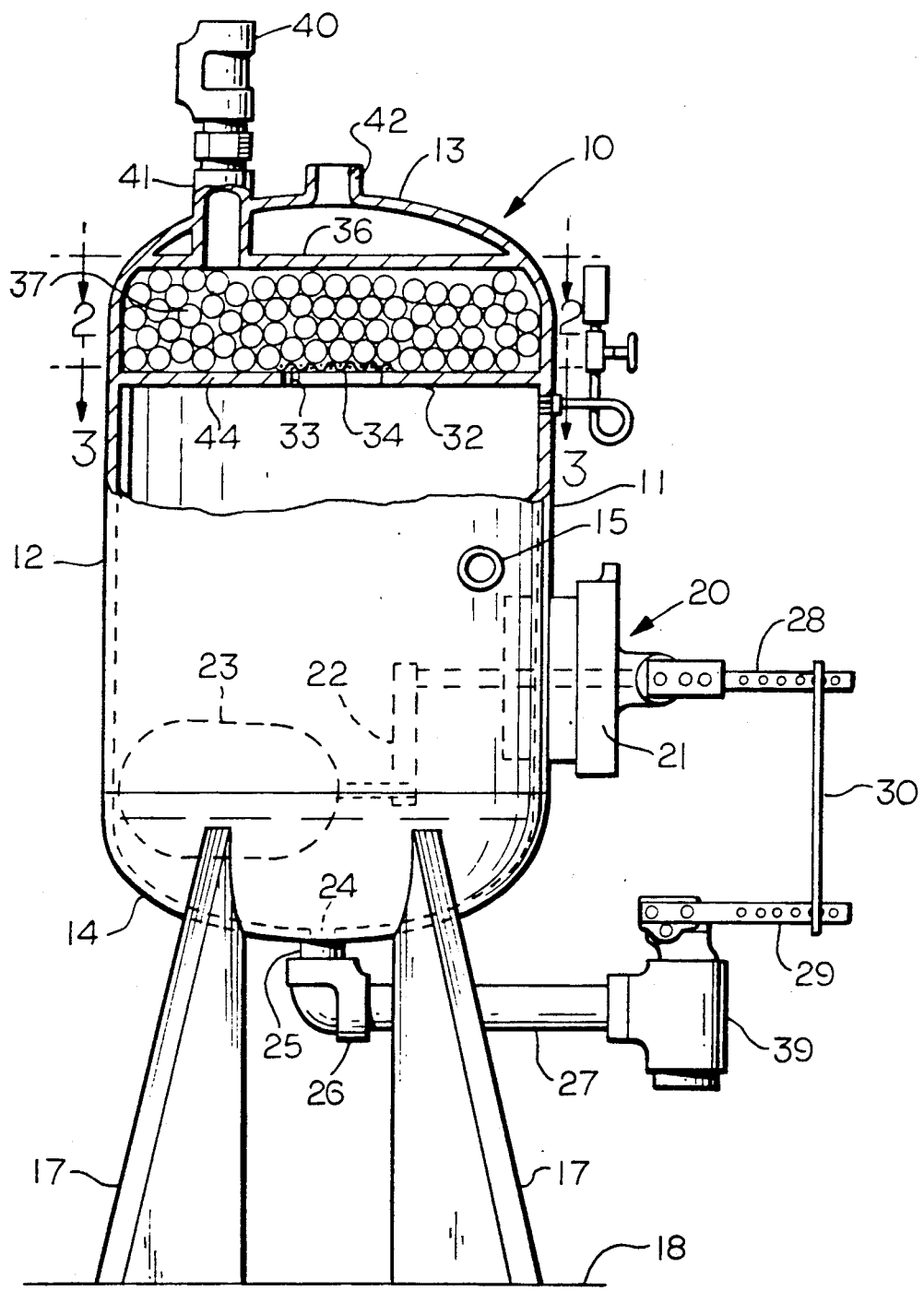
FIG. 1 is a vertical elevational view partly in vertical section showing the subject gas-liquid separator.

As shown in FIG. 1 of the drawings, the separator designated by the numeral 10 comprises a substantially cylindrical vessel 11 having a right-cylindrical body portion 12 with its upper and lower ends enclosed by a bulbous semi-spherical upper head 13 and a similarly-shaped lower head 14, both of which are normally welded to the cylindrical body portion 12. The body and head portions are normally comprised of heavy-walled steel components adapted to withstand substantial internal pressures normally ranging from about 200 to 550 psi, and above. Carbon steel is a preferred material for the vessel having sidewalls ranging from about 3/8 to 1/2 inch in thickness.

An inlet line 15 for the combined mixture of gas and liquid is mounted in tangential relation to the vessel in an intermediate area of body portion 12. The gas-liquid mixture which is delivered into the vessel from the well under pressure is given a centrifugal pattern of movement by the tangential inlet line 15 such that the mixture sweeps the interior sidewalls of the vessel body portion upon entering.

The vessel is supported by a series of spaced-apart leg members 17, such as four equal-length legs mounted in sloping relation upwardly from a metallic base plate 18, such legs being welded to both the pressure vessel and base plate in such manner that the vessel stands vertically upright in normal operating position. The legs are firmly attached to the lower head 14 of the vessel exterior surface with the base plate 18 having sufficient dimensions to maintain the separator in firmly-anchored stable vertical relation.

An automatic liquid-level control assembly 20 is mounted on the body portion of the vessel immediately below the inlet line 15. A truncheon element 21 is mounted exteriorly of the vessel to support the automatic level control unit 20 which is connected to a movable Z-shaped lever arm 22 mounted interiorly of the vessel. The lever arm 22 is attached to an internal float 23 which is capable of providing information on the upper level of the liquid contained within the vessel. A liquid drain 24 is located centrally in the bottom head of the vessel connected to a pipe nipple 25 and elbow 26 leading to a discharge pipe 27 which permits periodic discharge of the liquid from the vessel. Discharge pipe 27 is connected to a discharge valve 39 which is interconnected to the liquid level control unit 20. One type of automatic level control unit is KIMRAY, Product No. 860 HUTA, made and sold by KIMRAY Products Co.

The liquid level control unit serves to periodically discharge accumulations of liquid which are collected in the bottom portion of the vessel, largely in the lower head region. The liquid level control has a horizontal exterior extension arm 28 and the discharge valve 39 has a similar extension arm 29 which are connected by a rigid vertical rod 30 for its vertical movement to discharge the liquid accumulations at prescribed intervals as the liquid fraction is collected in the bottom of the vessel.

Figure 3:
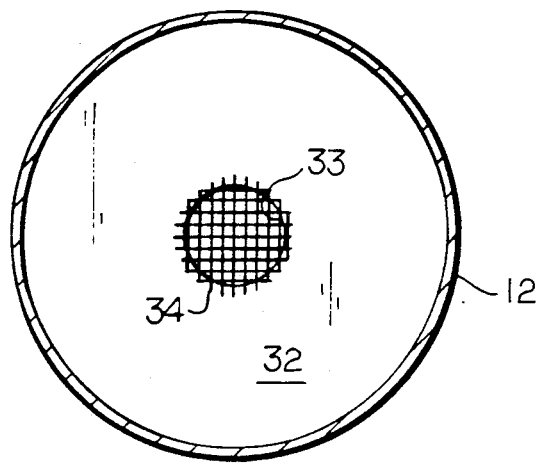
FIG. 3 is a horizontal sectional view of the mist—separation plate taken along the line 3—3 of FIG. 1.

A baffle plate 32 is mounted within an upper area of the vessel cylindrical body portion 12, normally being welded in horizontal relation within the vessel, a continuous peripheral weld being preferred. The baffle plate 32 requires upward passage of the gas-liquid mixture through a central aperture 33 in such plate. The central aperture 33 in the baffle plate is covered by a perforated or expanded metal plate 34 rigidly attached to the aperture periphery to retain the packing material thereabove within the vessel. Baffle plate 32 is shown mounted within the vessel in FIG. 3.

Figure 2:
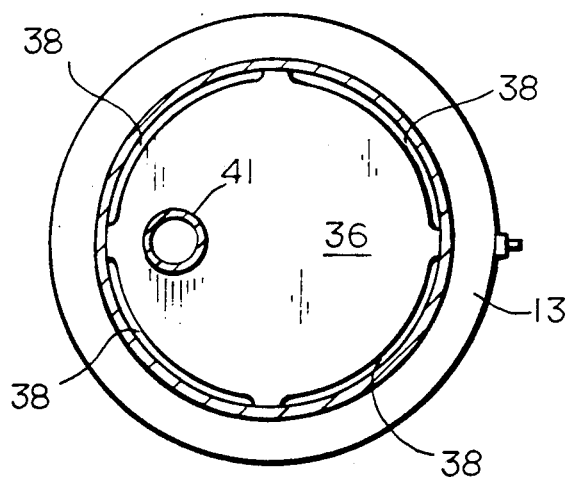
FIG. 2 is a horizontal sectional view of the apertured baffle plate of the separator taken along the line 2—2 of FIG. 1.

A mist-separator plate 36 is mounted in horizontal relation within the upper head of the vessel, such separator plate having semi-circular quadrant-shaped openings at its periphery adjacent the vessel sidewall within the upper head 13. The mist-separator plate 36 may have a single semi-circular shaped opening 38 at each of its four quadrants adjacent the vessel sidewall as shown in FIG. 2, or it may have a series of one or two semi-circular slots in the plate adjacent its periphery to permit circuitous upward flow of the gaseous components. Mist-separation plate 36 is shown in FIG. 2 with semi-circular openings 38 at its perimeter with pressure relief line 41 extending therethrough.

A gas outlet line 42 is attached to the upper head of the vessel in co-axial relation with the mist-separator plate 36 to permit outward transmission of the clean gas from the area of the packing material between the two plates. Thus, the gas is cleaned by its thorough wetting of the packing elements during its circuitous flow pattern through the packing column 37.

A relief valve 40 is mounted exteriorly of the upper head adjacent the gas outlet line 42 to permit automatic discharge of excessive gas pressure within the vessel. The relief valve line 41 extends upwardly through the upper head to the relief valve 40 and extends interiorly through an opening in the mist-separator plate 36 to facilitate loading of the packing material into the packing chamber between the plates 32 and 36. The pressure relief line 41 provides for initial introduction of a plurality of packing elements into the packing column and for replacement of the packing as desired or required. The packing chamber 37 is formed between the baffle plate 32 and the mist-separator plate 36, the plates normally having a spacing of from 1 to 12 inches to provide a sufficient volume of packing material for efficient separation of the gas and liquid constituents.

The packing material preferably consists of a plurality of similarly-shaped hollow cage-like non-interlocking plastic members each having a large surface area. The packing elements 44 may be either spherical or cylindrical in shape preferably having an overall dimension of about 1 inch with very large internal and external surface areas for contact wetting of their surfaces by the liquid components of the mixture. Such packing is normally formed of injection molded polypropylene plastic in various sizes ranging from about 1 to 3½ inch diameter. The symmetrical geometry of each individual packing element consists of a unique network of ribs, struts and drip rods having an extremely large void space for liquid wetting. The volumetric space between the baffle plate 32 and mist-separator plate 36 is filled with the packing material through the line 41 leading to the relief valve after the vessel is essentially fully fabricated. The particular packing material provides a superior pressure drop value up to about 90% reduction, such packing having an extremely high active surface area which is fully wetted during column operation.

Figure 4:
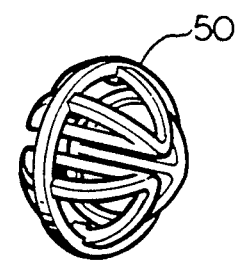
FIG. 4 is an enlarged perspective view of an individual hollow cage-like spherical packing element which is utilized in the packing column for contact by the combined gas-liquid mixture.
Figure 5:
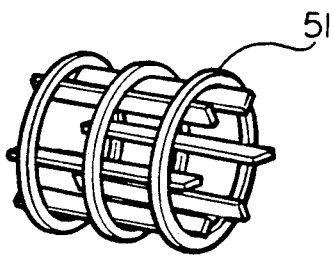
FIG. 5 is a view similar to FIG. 4 showing a hollow cage-like cylindrical packing element for use in the packing column.

FIG. 4 shows the spherical packing element 50 with great interior voids and FIG. 5 shows the cylindrical packing element 51 with similar interior voids. The packing elements 50 and 51 are preferably comprised of injection-molded polypropylene, but may also be formed of other injection-moldable plastics such as polyethylene, glass-filled polypropylene or Teflon.

With the prescribed packing material in place, operation of the separator provides an extremely low pressure drop while the packing remains free of plugging, fouling, nesting or wall channelling due to the non-interlocking characteristics of the packing material. The packing serves as a mist eliminator to provide essentially even gas to liquid distribution over the surfaces of the packing material, their unique character providing no interlocking or meshing of their surfaces. The packing may be either spherical or cylindrical in shape, for example, such plastic packing material being sold by Jaeger Products, Inc., a preferred material being polypropylene having about 1 inch diameter with a void space of about 90 percent and a geometric surface area of about 85 square feet per cubic foot. Such Jaeger products are marketed by Polymer Piping and Materials Company of Houston, Tex.

During operation of the separator, a minimal pressure drop across the packing chamber of about 2 to 4 inches of water column is typical of its operation. The separator is capable of operating at pressures up to about 600 psi, the normal range of internal pressure being about 200 to 550 psi. The separator is fully capable of separating natural gas-liquid mixtures ranging from a volumetric rate of about 0 to 1,000,000 cubic feet per day over many years of useful life without maintenance or pluggage of its working components. The separator is particularly useful for cleaning natural gas emitting from natural gas wells over the range of from 750,000 to 1,000,000 cubic feet per day in continuous operation, the cleaned natural gas being delivered directly to gas distribution systems and the collected liquids removed periodically from the bottom of the separator being delivered to a central collection point for separation of the water, oil and other contaminants in normal refining operations.

Accordingly, the improved gas-liquid separator and the method of operating to achieve such separation is simplified, providing an effective, safe, inexpensive and efficient separator and method of operation which achieves all of the enumerated objectives and solves problems and obtains new results in the art.

In the foregoing description, certain terms have been used for brevity, clearness and understanding; but no unnecessary limitations are to be implied therefrom beyond the requirements of the prior art because such terms are used for descriptive purposes and are intended to be broadly construed.

Having now described the features, discoveries and principles of the invention, the manner in which the improved gas-liquid separator is constructed and used in its several embodiments, the characteristics of the construction, and the advantageous, new and useful results obtained; the new and useful structures, devices, elements, arrangements, parts and combinations are set forth in the appended claims.

I claim:

1. A gas-liquid separator comprising a hollow pressure vessel having inlet means for a pressurized gas-liquid mixture and separate outlet means for said gas and liquid materials, a baffle plate having a central aperture located internally in an upper region of said vessel, a mist-separation plate having a plurality of peripheral openings located internally above said baffle plate in spaced relation therefrom, hollow plastic packing material having a substantial pervious large surface area located between said baffle plate and said mist-separation plate, said gas outlet means being located in an upper region of said vessel above said mist-separation plate and said liquid outlet means being located at a lower region of said vessel.

2. A gas-liquid separator in accordance with claim 1, wherein said inlet means for said pressurized gas-liquid mixture is located tangentially to the vessel sidewall at an intermediate region thereof.

3. A gas-liquid separator in accordance with claim 1, including means to automatically control the liquid level in a lower region of said vessel prior to its discharge from said liquid outlet means.

4. A gas-liquid separator in accordance with claim 1, wherein said apertured baffle plate and said mist-separation plate are spaced apart a distance ranging from about 1 to 12 inches, said packing material substantially filling the intermediate space therebetween.

5. A gas-liquid separator in accordance with claim 1, wherein said mist-separation plate has a series of semi-circular openings at its periphery adjacent the interior sidewall surface of said vessel.

6. A gas-liquid separator in accordance with claim 1, wherein the central aperture of said baffle plate has a perforated member covering said aperture to contain the said packing material.

7. A gas-liquid separator in accordance with claim 1, wherein said packing material is comprised of a plurality of similarly-shaped hollow cage non-interlocking plastic members each having a large surface area.

8. A gas-liquid separator in accordance with claim 7, wherein said packing material substantially fills the space between said baffle plate and said mist-separation plate.

9. A gas-liquid separator in accordance with claim 7, wherein said packing material is comprised of polypropylene.

10. A gas-liquid separator comprising a hollow cylindrical pressure vessel having bulbous heads enclosing its upper and lower extremities, inlet means for said pressurized gas-liquid mixture located tangentially to the vessel sidewall at an intermediate region thereof, outlet means for said gas located centrally in the upper head of said vessel, outlet means for said liquid located centrally in the lower head of said vessel, a baffle plate having a central aperture located internally in an upper region of said vessel, a mist-separator plate having peripheral openings located internally above said baffle plate in spaced-apart relation therefrom, hollow plastic packing material comprised of a plurality of plastic cage members providing a large surface area located between said baffle plate and said mist-separation plate, and means to automatically control the liquid level in a lower region of said vessel prior to its periodic discharge from said liquid outlet means.

11. A gas-liquid separator in accordance with claim 10 wherein said plastic packing material is comprised of polypropylene.

12. A gas-liquid separator in accordance with claim 10, wherein said baffle plate and said mist-separation plate are spaced apart a distance ranging from about 1 to 12 inches.

13. A gas-liquid separator in accordance with claim 10, wherein said means to control the liquid level in the lower region of said vessel comprises an internal movable float member connected to a discharge valve to discharge incremental volumes of said liquid from said vessel.

14. A gas-liquid separator in accordance with claim 10, wherein said hollow vessel has pressure-tight sidewalls adapted to withstand internal gas pressure ranging from about 200 to 550 psi.

15. A gas-liquid separator in accordance with claim 10, wherein said packing material is comprised of hollow, spherical-shaped high-void-space individual packing members comprised of polypropylene having a diameter of about 1 inch with essentially all of their surface areas capable of being fully wetted during separation.

16. A gas-liquid separator in accordance with claim 10, wherein the said separator is constructed of metallic components operable at a temperature ranging from about ambient temperature to about 180° F. to protect the said plastic packing material against softening or fusion.

* * * * *